United States Patent
Fedi et al.

(10) Patent No.: US 10,011,527 B2
(45) Date of Patent: Jul. 3, 2018

(54) INTEGRATED PROCESS FOR THE PRODUCTION OF CLINKER WITH TREATMENT OF BYPASS DUSTS PRODUCED BY THE KILN

(71) Applicant: Italcementi S.p.A., Bergamo (IT)

(72) Inventors: Roberto Fedi, Bergamo (IT); Antonio Clausi, Bergamo (IT); Giovanni Cinti, Bergamo (IT)

(73) Assignee: ITALCEMENTI S.P.A., Bergamo (IT)

( * ) Notice: Subject to any disclaimer, the term of this patent is extended or adjusted under 35 U.S.C. 154(b) by 454 days.

(21) Appl. No.: 14/374,187

(22) PCT Filed: Jan. 29, 2013

(86) PCT No.: PCT/EP2013/051605
§ 371 (c)(1),
(2) Date: Jul. 23, 2014

(87) PCT Pub. No.: WO2013/113664
PCT Pub. Date: Aug. 8, 2013

(65) Prior Publication Data
US 2014/0345349 A1    Nov. 27, 2014

(30) Foreign Application Priority Data
Jan. 31, 2012  (IT) .............................. MI2012A0123

(51) Int. Cl.
C04B 7/60  (2006.01)
C05G 3/00  (2006.01)
(Continued)

(52) U.S. Cl.
CPC .............. *C04B 7/60* (2013.01); *C04B 7/364* (2013.01); *C04B 7/436* (2013.01); *C05D 1/02* (2013.01);
(Continued)

(58) Field of Classification Search
CPC ........ B01D 2253/34; B01D 2258/0233; B01D 53/77; C04B 7/364; C04B 7/436;
(Continued)

(56) References Cited

U.S. PATENT DOCUMENTS

2011/0005350 A1    1/2011  Konishi

FOREIGN PATENT DOCUMENTS

DE         44 43 563 A1    6/1996
EP         1795510 A1      6/2007
(Continued)

OTHER PUBLICATIONS

Abd Al-Aleem, S.; Abd-Al, M.A.; Hiekal, Mohamed; Abdel-Aziz, Magdy. "Effect of Cement Kiln Dust Substitution on Chemical and Physical Properties and Compressive Strength of Portland and Slag Cements". Nov. 2005. Retrieved from https://www.researchgate.net/publication/242232386_EFFECT_OF_CEMENT_KILN_DUST_SUBSTITUTION_ON_CHEMICAL_AND_PHYSICAL_PROPERTIE.*

*Primary Examiner* — Shuangyi Abu Ali
(74) *Attorney, Agent, or Firm* — Florek & Endres PLLC

(57) ABSTRACT

It is described an integrated process for the production of clinker by dry process, with treatment in continuous of by-pass dusts produced by the kiln, wherein the solid matter to treat consists of bypass dusts of a clinker production process, containing compounds of chloride, sodium, potassium and sulphur, such a process comprising the following steps: a) extraction of the bypass dusts directly from the phase of quench, without intermediate storage, at a temperature comprised between 150 and 200° C., with a moisture content varying from 0.1 to 3% by weight, preferably from 0.1 to 0.5% by weight, and with a quantity of calcium carbonate lower than 55% by weight; b) mixing of said dusts coming from step a), within a maximum time comprised between 2 and 10 minutes, preferably lower than about 5

(Continued)

minutes, with water up to a water/dusts ratio varying from 2:1 to 4:1, preferably from 2.5:1 to 3.5:1, in a way to obtain a mixture with a moisture content comprised between 45 and 75% by weight, preferably between 50% and 55% by weight, even more preferably equal to about 50% by weight; c) mechanical stirring of the mixture diluted up to complete dissolution of the soluble salts; d) mechanical separation of the mixture so diluted in a liquid fraction containing water and soluble salts and in a solid fraction in form of cake or crust.

8 Claims, 1 Drawing Sheet

(51) Int. Cl.
  *C04B 7/43*   (2006.01)
  *F27B 7/20*   (2006.01)
  *F27D 17/00*   (2006.01)
  *C04B 7/36*   (2006.01)
  *C05D 1/02*   (2006.01)
  *B01D 53/77*   (2006.01)

(52) U.S. Cl.
  CPC ............. C05G 3/00 (2013.01); C05G 3/0076 (2013.01); F27B 7/2016 (2013.01); F27D 17/008 (2013.01); *B01D 53/77* (2013.01); *B01D 2253/34* (2013.01); *B01D 2258/0233* (2013.01); *Y02P 20/125* (2015.11)

(58) Field of Classification Search
  CPC .... C04B 7/60; C05D 1/02; C05G 3/00; C05G 3/0076; F27B 7/2016; F27D 17/008; Y02P 20/125
  See application file for complete search history.

(56)      References Cited

FOREIGN PATENT DOCUMENTS

| | | | |
|---|---|---|---|
| EP | 1923366 A1 | 5/2008 | |
| JP | 2003001218 A | 1/2003 | |
| WO | WO 2006081827 A1 * | 8/2006 | ............ B01D 53/78 |

* cited by examiner

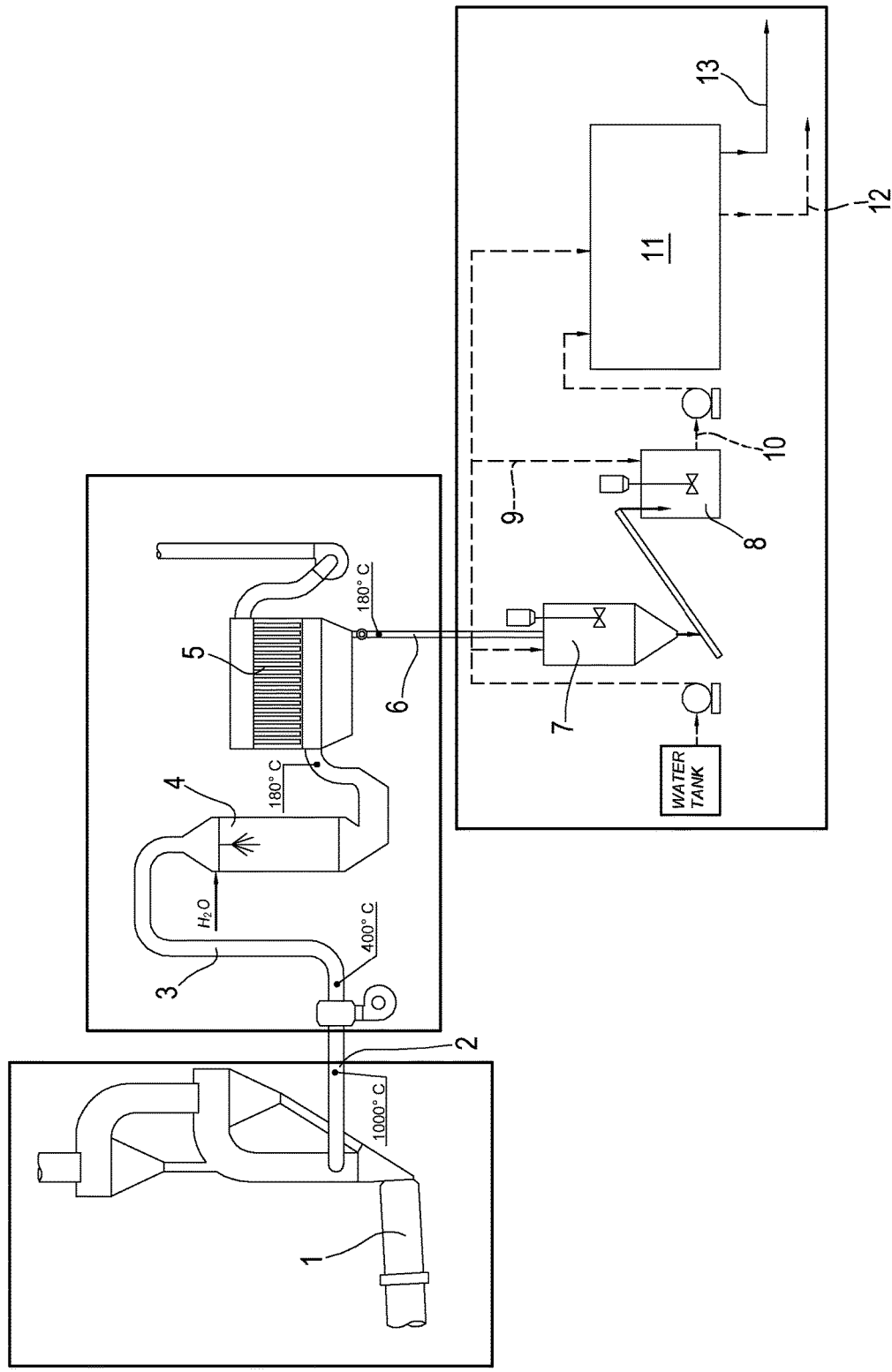

INTEGRATED PROCESS FOR THE PRODUCTION OF CLINKER WITH TREATMENT OF BYPASS DUSTS PRODUCED BY THE KILN

The present invention refers to an integrated process for the production of clinker with treatment of bypass dusts produced by the kiln.

The production process of clinker and thus of cement involves on industrial scale a plurality of phases connected and subsequent to each other, and the step of baking of the raw materials is the step that mostly characterizes the whole process of production.

The phase of baking is however preceded by the following phases: extraction of raw materials from mine, mixing of the raw materials in suitable proportions to obtain the raw mixture from clinker for cement and the phase of grinding of clinker with corrective substances such as gypsum, limestone, slag and pozzolana.

The technological cycle in its whole and the phase of baking in particular have been over the time subjected to two main transformations: the former relates to the process in itself. As a matter of fact, the so-called "wet" technology, in which the raw mixture was fed to the kiln in the form of aqueous sludge, was replaced by the "semi-dry" technology, in which the raw mixture was fed to the kiln in form of grain obtained by adding limited quantities of water to the raw mixture dry grinded, to arrive then at the currently named "dry" technology, in which the raw mixture is fed to the kiln in form of dust. Such a dust is produced in a grinding plant, directly connected to the kiln itself, which exploits the residual content of thermal energy of the gases coming from the kiln to dry the moisture naturally associated to the raw materials to grind. As previously indicated, the phase of baking of the raw materials is the phase that mostly characterizes the whole process of production and the most recent evolution of the baking phase relates to the introduction of the calciner. In the calciner is introduced most part of the energy required for the process, said energy being necessary for the decarbonation of the limestone contained in the raw mixture. It stands for a real reactor in which the reaction of decarbonation is carried out in an almost complete manner.

A second evolution instead regarded the dimensions of the kiln in which the baking process occurs, said dimensions being progressively increased with the grow of the unit potentiality required to this apparatus: it started from a production of hundreds of tons a day to arrive at a production of thousands of tons a day, with consequent size increase of the apparatus and of the material and energy flow connected thereto.

A typical aspect associated with these processes is the presence of at least a gas emission in the atmosphere, specifically the emission of gas coming from the clinker kiln, in which are inevitably dispersed dusts deriving from the process itself: this emission is generally defined as "process emission".

The dusts associated with the process emissions, defined with the generic term "flue dust", have a variable composition depending on the process from which they derive.

For the kilns in processes according to the "wet" and "semi-dry" technology, the dusts are caught from a filtration apparatus of the electrostatic type or of the tissue sleeve type, placed in line with the kiln itself. The composition of these dusts is very similar to the composition of the raw mixture fed to the plant, with the addition of elements such as Na, K, Cl, S, known as minor elements, as they are present in the raw materials or in the fuels in a quantity much lower than the main elements necessary for the formation of clinker from clinker, that is to say Ca, Si, Al and Fe.

The minor elements, and Cl in particular, are indeed very partially taken from the clinker produced and are eliminated with the dusts sent to the chimney and caught by the filter arranged in correspondence of such an emission point.

This feature of the wet and semi-dry technologies leads often to define this kind of processes as "open" processes, in that in general there is no risk of accumulation of these elements within the process itself. The dusts, as said, composed of raw mixture and enriched in minor elements, are specifically known as "cement kiln dust" or CKD.

For the kilns in processes according to the "dry" technology, with or without a precalciner, the dusts associated with the process emission show a profile of composition fully different: these dusts are as a matter of fact no longer produced by the baking kiln, but rather they are produced by the grinding mill of the raw mixture, being the apparatus, as previously said, arranged in series along the path of the gases coming from the clinker kiln. The process filter of these plants actually has not only an ecological task, but also a technological task: indeed, it must recover the production of the grinding mill, that is the raw mixture which shall be then fed to the kiln.

It is obvious that, in this kind of process, all the minor elements, such as Na, K, Cl, S, as above mentioned, turn back to the baking process, said process inevitably getting progressively richer in these elements.

For the processes of production of clinker according to the dry technology, two situations may occur:

The amount of minor elements, introduced in the process with the raw materials and the fuels, is sufficiently low to be balanced with the quantity of the same released by the clinker produced;

The amount of the minor elements, introduced in the process with the raw materials and the fuels, exceeds specific limits, which are quite variable according to the specific process and the ratios among the several minor elements, mostly in the presence of even very low amounts of Cl, that is in the order of some hundreds ppm on the raw mixture. In such a situation, the minor elements accumulate in the kiln causing incrustations, in its rotating part and in its static part, that in a short time force the stop of the plant with huge losses of production.

This feature of the dry technology leads to define these kind of processes as "closed" processes.

To "open" these cycles of evaporation of the minor elements in the baking zone and recondensation of the same on the walls of the kiln, it has been created a drainage of the gases coming from the rotating part of the kiln, by applying the so called "bypass" apparatus.

Such an apparatus is a system capable to sample from the rotating tube of the kiln a rate of produced gases, gases in which the above said minor elements are present in a gaseous form, in that their temperature at the sampling point is of the order of a thousand of degrees centigrade, and cool them abruptly, causing their condensation in the form of solid dust. This dust is then captured by a proper filter, of the electrostatic or tissue sleeve type, and is moved away from the plant.

The bypass plants known are composed, for example, of a probe for extraction of gas at 1000° C., of a system for cooling the gases extracted by dilution with air up to a temperature of about 400° C., of a nebulized water cooling tower to reduce the temperature of said extracted gases up to a temperature lower than 200° C., that is at a temperature generally tolerated by the next apparatuses of depulverization (for example filters).

Of course, the bypass system extracts at the exit of the rotating tube, along with the rate of gases produced, also huge amounts of dust during the phase of treatment, said dust, especially in the case of a kiln with a precalciner, being rich in decarbonated material, that is of calcium oxide, as well as of calcium carbonate (limestone).

These dusts are called dusts of bypass (by pass dust) and, as remarked, they are physically and chemically different from the previous dusts deriving from wet or semi-dry processes.

The bypass dusts are generally re-used downstream of the baking process for the production of cement. In the case in which this type of re-use is not possible due to the quantity of dusts and/or the type or feature of the cement produced, which cannot tolerate recovery of said dusts, the dusts are necessarily disposed of in a landfill. Said practice is largely spread, but it is less and less compatible with the concepts currently in use of environmental compatibility, also considering the growing capability of the new production lines.

The minor elements previously mentioned are in fact present in the form of oxides. In the case of Na and K they tend to form alkaline sulphates which are quite easy to be extracted together with the clinker from cement, in that such compounds evaporate only partially in the baking zone. However, Na and K, in the presence of chlorine, show a higher affinity for this element, they tend to combine with it and to form potassium and sodium chlorides. Sodium chloride and potassium chloride totally evaporate in the baking zone and then recondense at temperatures of 600-700° C., when along with the gases of the kiln go up to the plant towards the coldest zones. In general, the bypass dusts contain up to 10-15% of alkaline chlorides.

It is known that these two compounds are soluble in water, whereas the other constituents of the raw or partially decarbonated mixture are not soluble, except for an extremely limited and negligible fraction. It is consequent that a possible solution of the technical problem as previously outlined, is that of treating the bypass dusts with water in a way that their content in soluble salts is transferred from the solid phase into the liquid phase. Once Na, K, Cl are moved away, these dusts newly present chemical features which are compatible with the baking process, resulting even better than the dusts fed to the baking process, in that they are already finely grinded and already contain decarbonated material.

The processes of treatment of the bypass dusts which exploit the solubility of such compounds in water are generally washing processes already known and extensively described in literature from decades.

The processes of the state of the art show however the following drawbacks. The storage of the bypass dusts coming from the treatment of quenching previously described implies physical modifications of the dusts themselves that tend to transform into a block, hard to be treated. As a matter of fact, the hydration in the phase of quench leads to the formation of calcium hydrate, which is known to be a binder and at the temperature leaving the quench tends to solidify creating a single block, much more complicated to be treated and definitely involving much higher costs.

Storing these dusts is thus a problem as their extraction from the stocking sites is particularly difficult.

The applicant has therefore surprisingly identified an integrated process for the production of clinker, with the treatment of bypass dusts produced by the kiln, that allows to overcome the drawbacks of the processes according to the state of the art and can be directly applied to the site of production of the same dusts and integrated in already existing plants of production of clinker.

This allows to achieve an even more interesting process from an environmental and economical point of view, recovering at the same time the valued solid material to be re-used in the production of clinker.

In particular, it is object of the present invention an integrated process for the production of clinker by dry technology, with continued treatment of bypass dusts produced by the kiln, wherein the solid matter to be treated consists of bypass dusts of a process of clinker production, containing compounds of chlorine, sodium, potassium and sulphur, said process comprising the following steps:

a) extraction of the bypass dusts directly from the phase of quench, without intermediate storage, at a temperature comprised between 150 and 200° C., with a moisture content ranging from 0.1 to 3% by weight, preferably from 0.1 to 0.5% by weight, and with an amount of calcium carbonate lower than 55% by weight;

b) mixing of said dusts coming from step a), within a maximum time comprised between 2 and 10 minutes, preferably lower than about 5 minutes, with water up to a water/dusts ratio ranging from 2:1 to 4:1, preferably from 2.5:1 to 3.5:1, in a way to obtain a mixture with a moisture content comprised between 45 and 75% by weight, preferably between 50% and 55% by weight, even more preferably equal to about 50% by weight;

c) mechanical stirring of the mixture diluted up to complete dissolution of the soluble salts;

d) mechanical separation of the mixture so diluted in a liquid fraction containing water and soluble salts and in a solid fraction in form of cake or crust.

The solid fraction obtained at the end of the process of washing according to the present invention consists of a solid fraction with residual amounts of minor elements and in particular of chlorine, fully compatible with its re-use in the process.

Specifically, it is a particularly valued material that shows chemical characteristics compatible with the baking process, resulting to be even better of the dusts fed to the baking process, in that it is already finely grinded and contains material which is already decarbonated.

The point of reintroduction of the solid fraction treated can be provided upstream of the mill for the grinding of the raw mixture, to the mill itself or also to the calciner, according to the layout of the plant and of the local requirements.

The liquid fraction, containing water and soluble salts, obtained at the end of step d) of the integrated process according to the present invention, can be instead evaporated and the salts recovered, in a quantity of the order of magnitude lower than the quantity of bypass dusts, sent to the landfill or to a possible re-use.

Alternatively, such a liquid fraction containing water and soluble salts, obtained at the end of step d) of the integrated process according to the present invention, can be employed for agricultural uses, in particular for irrigate the fields. Indeed, the presence of alkaline soluble salts does not create problems in the agricultural use of such a liquid fraction and, actually, for some types of cultures such as for example cotton, the presence of sodium and potassium chlorides is particularly interesting. It is therefore a further object of the present invention the agricultural use of the liquid fraction coming from step d), properly diluted, in particular to irrigate the fields.

It is object of the present invention also a solid fraction with an amount of chlorides lower than 1% by weight and comprising a quantity from 20 to 30% by weight of decarbonated material, obtained from the integrated process according to the present invention.

Such a solid fraction, preferably, has an amount of chlorides lower than 0.5% by weight.

The continued treatment of the bypass dusts extracted from the phase of quench is made surprisingly possible thanks to the identification of particular conditions of treatment. Indeed, in the integrated process according to the present invention it is just the combination of the treatment of a dust characterized by a content of calcium carbonate lower than 55% by weight, at a temperature comprised between 150 and 200° C., with a moisture content varying from 0.1 to 3% by weight, preferably from 0.1 to 0.5% by weight, and the mixing of said dust with water, up to a water/dust ratio ranging from 2:1 to 4:1, preferably from 2.5:1 to 3.5:1, within a maximum time comprised between 2 and 10 minutes, preferably lower than about 5 minutes, in a way to obtain a mixture with a moisture content comprised between 45 and 75% by weight, preferably between 50% and 55% by weight, even more preferably equal to about 50% by weight, that allows to carry out the process in continuous, instead of in batch as in the processes of the state of the art.

In particular, the integrated process in continuous according to the present invention allows a production cycle with a flow in continuous without need of providing a tower for storing the bypass dusts.

Moreover, the immediate treatment of the bypass dusts with a process in continuous allows to exploit in the best way the particular physical structure of the dust particles, on the surface of which is deposited a layer of alkaline chlorides, as well as the moisture already present in the same.

Therefore, dissolving directly in water the bypass dusts leaving the quench in an integrated plant running in continuous is particularly advantageous with respect to the batch plants.

As previously indicated, the Applicant has surprisingly found a series of conditions that make possible such an integrated process in continuous. First of all, it is crucial that the system of dilution of the bypass dusts with water in the quantities previously indicated takes place in a maximum time comprised between 2 and 10 minutes, preferably lower than about 5 minutes. The total time of the steps a)-b) is crucial to avoid phenomena of gelification of the calcium hydrate in the next step c) of mechanical stirring, that would hinder the subsequent dehydration.

It is therefore important that the plurality of steps a)-b) is achieved in a time varying from 2 to 10 minutes, preferably lower than about 5 minutes.

The need of reducing the contact time between the dusts and the water is linked also to the prevention from phenomena of excessive reduction of the diameters of the dust particles with consequent difficulty in the separation of the same from the water in which they are dispersed.

The washing tests carried out on experimental scale have indeed shown that, exceeding five minutes of permanence in water of the suspension of dusts, the time of treatment of the aqueous sludge for the subsequent dehydration extends uncontrolled, making necessary a size reduction of the water separation devices, not compatible with an industrial application.

In particular, once the suspension of the bypass dusts is formed in water during step b) of the integrated process, the salts dissolve immediately. As the suspension, by effect of the temperature of extraction of the bypass dust from the phase of quench, and due to presence of oxides which hydrate themselves, generating heat, could reach the boiling temperature, the water/dust ratio is crucial, as said, which also depends on the need of maintaining specific temperatures and avoid the phenomenon of boiling due to the oxides present in the suspension which hydrate themselves.

The present invention also refers to an apparatus for the achievement of the integrated process according to the present invention.

It is indeed a further object of the present invention an apparatus for the treatment in continuous of bypass dusts produced by a clinker kiln in an integrated process for the production of clinker by dry technology, comprising an apparatus of quench consisting of a probe for sampling gases from the clinker kiln, a system for cooling the gases extracted for dilution with air, a nebulized water cooling tower, a depulverization device; characterized in that said apparatus of quench is directly connected to an apparatus of dissolution and mixing of the dusts in water, in turn connected to an apparatus of washing of the dusts.

In particular, the apparatus of dissolution and mixing of the dusts in water is provided with a bath for dissolution and mixing, in which are fed the dusts extracted from the zone of quench and water in the required proportions and temperatures. The suspension so obtained is left under stirring and then fed to the washing apparatus (schematically illustrated in the FIGURE).

The integrated process and the apparatus according to the present invention are illustrated in FIG. 1.

With reference to FIG. 1, bypass dusts are extracted from the clinker kiln 1, by means of a probe for sampling gases 2 and are fed to a cooling system 3 of the extracted gases for dilution with air from which they are fed to a nebulized water cooling tower 4 and to a depulverization device 5.

The bypass dusts collected by the depulverization device 5 are thus fed through line 6 to a feeding system 7 to the bath of dissolution and mixing 8. To this bath is also fed, through line 9, the required quantity of water. The suspension of dusts in water, suitably mixed, is then fed through line 10 to the washing apparatus 11.

The phase of washing of the dusts can be achieved according to any of the methods known to the state of the art and with whichever apparatus already known to and applied by the state of the art in this respect.

In particular, step d) of mechanical separation of the mixture so diluted can be achieved through suitable means of separation such as rotary drum filters, belt filters, pressure filters, per se known, and allows to obtain a liquid fraction containing water and soluble salts exiting through line 12 and a solid fraction in form of cake or crust exiting through line 13.

The solid fraction in form of cake or crust, coming from such a mechanical separation phase can be subjected to one or more further washings with water or with proper washing fluid.

These further phases of washing of the dusts can be achieved by feeding the water or the washing fluid in counter-current with respect to the fluid direction of the solid fraction.

The washing apparatus can also be provided at the exit with a device for drying the solid fraction.

Such a drying device or removal of the water or of the suitable washing fluid from the solid fraction can provide the removal of the water by use of a gaseous flow, preferably air, possibly by applying also a pressure lowering, obtained through suction pumps.

With the objective to better illustrate the invention is now provided the following example which shall be considered as illustrative and not limitative of the same.

EXAMPLE 1

The present example has been carried out on a sample of about 6 tons of by-pass dusts, coming from the cement factory of Tourah, belonging to the Egyptian branch Suez Cement of Italcementi Group, having an average composition as reported in the table below:

| DUST | | |
|---|---|---|
| Chemical Analysis | | |
| Loss on Ignition (LOI) | % | 11.61 |
| Cl— | % | 9.66 |
| Spectrometric RX Analysis | | |
| SiO2 | % | 15.03 |
| Al2O3 | % | 3.54 |
| Fe2O3 | % | 2.28 |
| CaO | % | 39.78 |
| MgO | % | 1.68 |
| SO3 | % | 4.42 |
| Na2O | % | 4.27 |
| K2O | % | 6.23 |
| SrO | % | 0.11 |
| Mn2O3 | % | 0.03 |
| P2O5 | % | 0.11 |
| TiO2 | % | 0.26 |

Said dust therefore contains about 48% by weight of $CaCO_3$, as derivable from the percentage of loss on ignition.

The dusts have been extracted in continuous in proper fractions of 1.5 tons from the zone of quench and fed in continuous to a mixing and dissolution bath having a volume of about 1 m$^3$, in which the dusts have been gradually mixed with about 750 liters of water (for a total of 3000 liters) and sent, always in continuous, to the drying phase.

The phase of preparation of the suspension and sending to the washing and dehydration system has been effected in a period of time of about 5 minutes. In the case of the present example, the material to be subjected to drying has been arranged on a water-resistant carpet and, during the moving forward of such a carpet from the loading zone to the unloading zone, the wet material has been dehydrated. At the end of the dehydration phase, corresponding to the end of the passage of the material on the water-resistant carpet and carried out under standard conditions, the recovered material resulted in a crust apparently dry, having a residual content of moisture of 18% by weight.

The recovered material had on average scale the following chemical composition on the dry matter:

| SLUDGE | | |
|---|---|---|
| Chemical Analysis | | |
| Loss on Ignition (LOI) | % | 28.09 |
| Cl— | % | 0.99 |

| SLUDGE | | |
|---|---|---|
| Spectrometric RX Analysis | | |
| SiO2 | % | 13.91 |
| Al2O3 | % | 3.42 |
| Fe2O3 | % | 2.33 |
| CaO | % | 44.26 |
| MgO | % | 1.62 |
| SO3 | % | 3.09 |
| Na2O | % | 0.73 |
| K2O | % | 0.91 |
| SrO | % | 0.11 |
| Mn2O3 | % | 0.02 |
| P2O5 | % | 0.09 |
| TiO2 | % | 0.20 |

It has been further observed that, extending the periods of permanence of the material in the dispersed phase in water, the dehydration of the dust/water suspension got increasingly difficult.

The process according to the present invention is moreover particularly efficient in order to diminish the content of chloride of the bypass dusts: it started indeed from an initial content equal to 9.66% by weight to arrive at a residual content in the treated material equal to 0.99% by weight.

The invention claimed is:

1. An integrated process for the production of clinker by dry process, with treatment in continuous of bypass dusts produced by the kiln, wherein the solid matter to treat consists of bypass dusts of a clinker production process, containing compounds of chloride, sodium, potassium and sulphur, such a process comprising the following steps:
    a) extraction of the bypass dusts directly from the phase of quench, without intermediate storage, at a temperature comprised between 150 and 200° C., with a moisture content varying from 0.1 to 3% by weight, and with a quantity of calcium carbonate lower than 55% by weight;
    b) mixing of said dusts coming from phase a), within a maximum time comprised between 2 and 10 minutes, with water up to a water/dusts ratio varying from 2:1 to 4:1, in a way to obtain a mixture with a moisture content comprised between 45 and 75% by weight;
    c) mechanical stirring of the mixture diluted up to complete dissolution of the soluble salts; and
    d) mechanical separation of the mixture so diluted in a liquid fraction containing water and soluble salts and in a solid fraction in form of cake or crust.

2. The integrated process according to claim 1, wherein the sum of steps a)-b) is carried out in a period of time varying from 2 to 10 minutes.

3. The integrated process according to claim 1, wherein the reintroduction of the treated solid fraction is provided upstream of the grinding of the raw mixture.

4. The integrated process according to claim 2, wherein the reintroduction of the treated solid fraction is provided upstream of the grinding of the raw mixture.

5. The integrated process according to claim 1, wherein the sum of steps a)-b) is carried out in a period of time lower than about 5 minutes.

6. The integrated process according to claim 1, wherein the moisture content of step a) varies from 0.1 to 0.5% by weight.

7. The integrated process according to claim 1, wherein the water/dusts ratio of step b) varies from 2.5:1 to 3.5:1.

8. The integrated process according to claim 1, wherein the moisture content of step b) varies between 50% and 55% by weight.

\* \* \* \* \*